US011422017B2

(12) United States Patent
Hartmann et al.

(10) Patent No.: US 11,422,017 B2
(45) Date of Patent: Aug. 23, 2022

(54) METHOD AND SYSTEM FOR DETERMINING A MASS FLOW RATE BY AVERAGING A PUMP PARAMETER

(71) Applicant: HOCHLAND SE, Heimenkirch (DE)

(72) Inventors: Robert Hartmann, Heimenkirch (DE); Matthias Rother, Wangen im Allgäu (DE)

(73) Assignee: Hochland SE, Heimenkirch (DE)

( * ) Notice: Subject to any disclaimer, the term of this patent is extended or adjusted under 35 U.S.C. 154(b) by 124 days.

(21) Appl. No.: 16/632,971

(22) PCT Filed: Jul. 18, 2018

(86) PCT No.: PCT/EP2018/069511
§ 371 (c)(1),
(2) Date: Jan. 22, 2020

(87) PCT Pub. No.: WO2019/020459
PCT Pub. Date: Jan. 31, 2019

(65) Prior Publication Data
US 2020/0149941 A1    May 14, 2020

(30) Foreign Application Priority Data
Jul. 24, 2017   (DE) .................... 10 2017 116 601.7

(51) Int. Cl.
*G01F 1/76*    (2006.01)
*A01J 25/00*   (2006.01)

(52) U.S. Cl.
CPC .............. *G01F 1/76* (2013.01); *A01J 25/002* (2013.01)

(58) Field of Classification Search
CPC ............ G01F 1/76; A01J 25/002; A01J 25/00
See application file for complete search history.

(56) References Cited

U.S. PATENT DOCUMENTS

| 3,252,618 A | 5/1966 | Anderson et al. |
| 4,796,782 A | 1/1989 | Wales et al. |

(Continued)

FOREIGN PATENT DOCUMENTS

| JP | H01225468 A | 9/1989 |
| JP | 2002085042 A | 3/2002 |

(Continued)

OTHER PUBLICATIONS

Manikandan S. Measures of central tendency: The mean. J Pharmacol Pharmacother. 2011;2(2):140-142. doi:10.4103/0976-500X.81920 (Year: 2011).*

(Continued)

*Primary Examiner* — Eric S. McCall
*Assistant Examiner* — Timothy P Graves
(74) *Attorney, Agent, or Firm* — Lelkes IP; Robert Lelkes

(57) ABSTRACT

Method and system for determining a specific mass flow rate of a highly viscous food product (1) having a viscosity of greater than 100 cP, which during processing in a continuous delivery flow is supplied to or removed from a buffer container (2) by means of a delivery pump (4) wherein a weighing device (7) is used to determine the change in the mass of the food product (1) in the buffer container (2) over a defined time period, which is in particular in the range of one or several minutes (Δm/Δt), wherein, in the same time period a pump parameter of the delivery pump (4) that is proportional to the expected delivery rate is registered, changes in the pump parameter over the time period are averaged to form an average pump parameter, wherein the current specific mass flow rate is calculated as a quotient from the change over time of the mass Δm/Δt and the averaged pump parameter and is output.

9 Claims, 1 Drawing Sheet

(56) References Cited

U.S. PATENT DOCUMENTS

| | | |
|---|---|---|
| 2002/0166589 A1 | 11/2002 | Tibbott |
| 2004/0186621 A1 | 9/2004 | Lewis et al. |
| 2004/0247745 A1 | 12/2004 | Shibauchi et al. |
| 2007/0144791 A1 | 6/2007 | Wolfschaffner |
| 2007/0207040 A1* | 9/2007 | Hughes ............... F04B 49/065 417/44.1 |

FOREIGN PATENT DOCUMENTS

| | | |
|---|---|---|
| JP | 2003075213 A | 3/2003 |
| JP | 2004329095 A | 11/2004 |
| JP | 2006518842 A | 8/2006 |
| JP | 2006285726 A * | 10/2006 |
| JP | 2006285726 A | 10/2006 |
| WO | 2010106546 A1 | 9/2010 |

OTHER PUBLICATIONS

Full examination report issued by IP Australia dated Sep. 24, 2020 in Australian patent application No. 2018305854.
Patent examination report issued by the New Zealand Intellectual Property Office dated Nov. 16, 2020 in NZ application No. 759653.

* cited by examiner

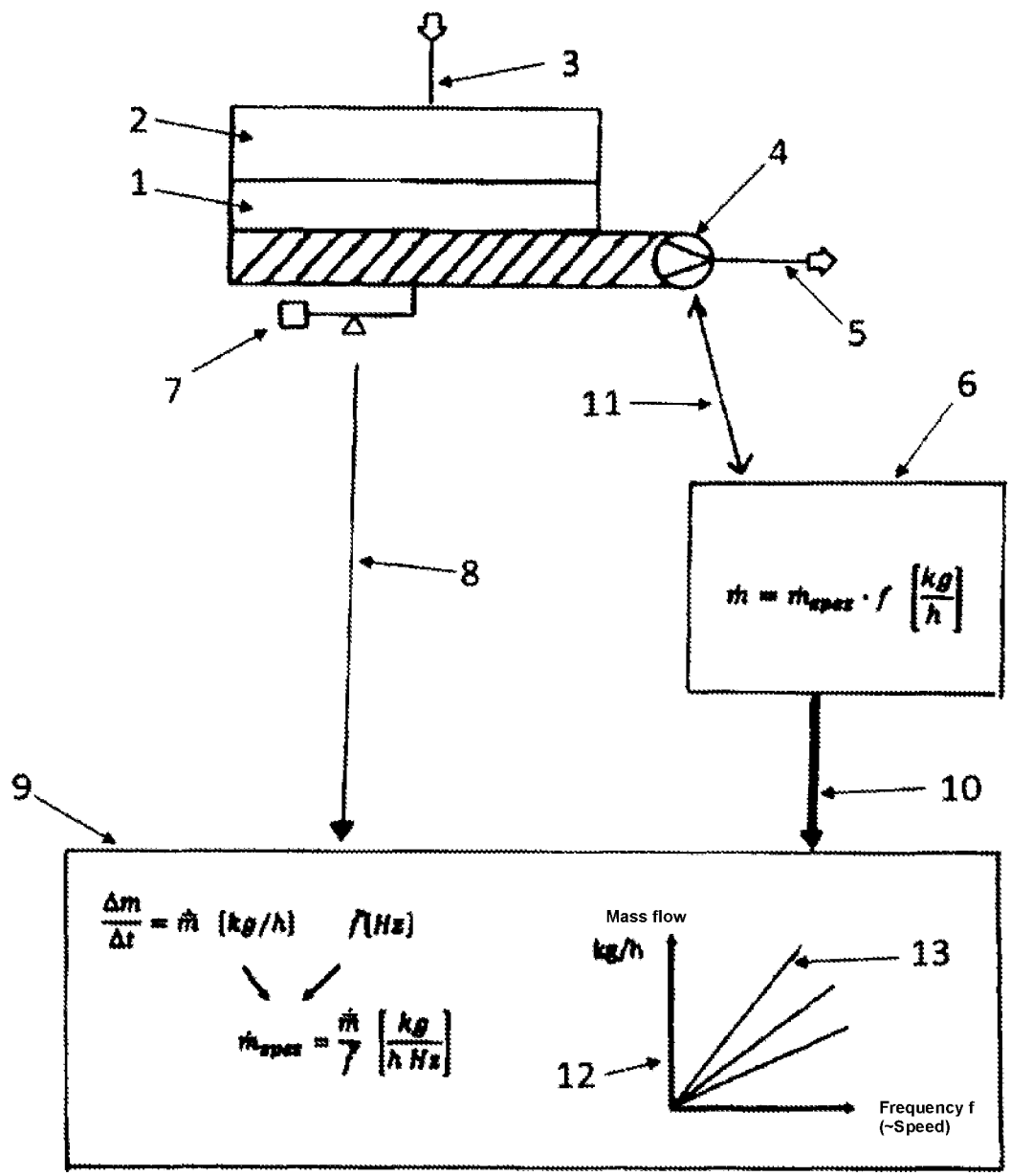

METHOD AND SYSTEM FOR DETERMINING A MASS FLOW RATE BY AVERAGING A PUMP PARAMETER

The invention relates to a method for determining a specific mass flow rate of a highly viscous food product having a viscosity of greater than 100 cP, in particular greater than 1000 cP, the food product, which is in particular a highly viscous to pasty processed cheese raw mixture, being supplied to or removed from a buffer container by means of a delivery pump during processing in a continuous delivery flow. The invention also relates to a system for carrying out the method.

As is known, measurements of the mass flow rate of a flowable product can be made using conventional mass flow rate measuring probes. For this purpose, magnetic-inductive flow meters are in particular known in which the product, which must have at least low conductivity, flows through a metal tube, which is penetrated by a magnetic field. In the tube there are measuring electrodes by means of which the change in the inductively generated measuring voltage caused by the product flow is measured. In the case of processed cheese raw mixtures, such magnetic-inductive flow meters provide only partially reliable measured values, in particular due to the product adhering to the tube and to the probes after a short period of use.

In addition, mass flow meters are known that are based on the Coriolis principle. In these flow meters, a pipe bend through which product flows is set into oscillation, which is measured by sensors mounted at the ends of the pipe bend, the mass flow being deduced from the phase difference. Such sensors are unsuitable for the measurement of highly viscous products, such as processed cheese raw mixtures, because they become clogged quickly because of the bends in the lines. In addition, these mass flow meters are relatively expensive.

In practice, the mass flow rate of such a highly viscous product may also be determined by means of the delivery pump, which pumps the product through the pipelines during processing. These determinations are based on the simplifying assumption that the speed of the pump with a linear pump characteristic curve is directly proportional to the delivered mass. For a product such as a processed cheese raw mixture, however, this assumption is only partially justified because of the considerable density fluctuations or the porosity, and therefore the type of measurement quickly reaches its limit, in particular with changing products, especially as the slippage in the pump also changes over time. Therefore, although the assumption of the linear mass flow rate is justified in the known operating state and the accuracy of the flow measurement is sufficient, in the longer term, the system must be continually recalibrated.

In addition, the flow rate over a change over time in the mass of a product can be determined in a buffer container as a quasi "moving average" by means of a weighing device. In this case, the decreasing weight of the buffer container is measured, which results from the product being removed from the buffer container and taken to further processing stages. With this so-called "loss-in-weight feeding," it is possible to estimate the average mass flow rate quite accurately, independently of the product and its density. Such methods are known for example from US 2004/0186621 A1, U.S. Pat. Nos. 4,796,782 and 3,252,618. With this loss-in-weight feeding method, however, short-term fluctuations that occur within the measurement interval cannot be recorded.

Such loss-in-weight feeding is known from JP 2003-075213 A, in which an operating parameter of the delivery pump is additionally measured in order to be able to computationally determine a volume throughput.

The problem addressed by the invention is now to propose a method which can be implemented simply and cost-effectively and with which a current and specific mass flow rate of a highly viscous food product, such as a processed cheese raw mixture in particular, can be reliably determined during processing and with which the power of the delivery pump can also be controlled in different states of the food product. In addition, the problem addressed is to provide a corresponding system for carrying out the method.

These problems are solved by the method according to claim 1 and the system according to claim 9. Preferred embodiments are found in the respective dependent claims.

According to the claims, the key concept of the invention is a combination of two of the methods described above. According to the invention, on one hand, a weighing device is used to determine the change over time in the mass ($\Delta m/\Delta t$) of the food product in the buffer container over a defined time period, which is in particular in the range of one or several minutes. At the same time, in the same time period a pump parameter of the delivery pump that is assumed to be proportional to the expected delivery rate is registered. The frequency of the frequency converter at which the motor of the delivery pump is actuated is suitable as such a parameter, for example. This frequency is in a certain proportion to the speed of the delivery pump. According to the invention, the changes in the selected pump parameter are averaged over the time period, such that an average value, thus an "average pump parameter," is obtained. From these measured values, a value for the current "specific" mass flow rate is then calculated as a quotient from the change over time of the mass $\Delta m/\Delta t$ and the pump parameter averaged over the same time period and is output for further processing. Using the value for the specific mass flow rate, an actual mass flow rate can then be set, again assuming the linearity of the pump parameter.

The method results in particularly reliable measured values, since on one hand, by means of the pump and using the pump parameter, for example, the "speed"—or using the proportional frequency of the frequency converter in [Hz]—the short-term fluctuations can be detected, and, on the other hand, the weighing cell makes it possible to accurately determine the average change in mass in a unit of weight, such as kilograms or pounds, over the time period of the measurement. From the change in the buffer weight over the time period and from the average speed of the delivery pump having a linear pump characteristic curve, a value for a "specific delivery capacity" can then be calculated in a unit "mass per pump parameter," in particular mass per speed or frequency of the converter, for example in kg/Hz or ib/Hz, and averaged over a defined time period. By multiplying this value for the "specific delivery capacity" with the currently set pump parameter, for example the frequency, the current mass flow rate can then be deduced.

Using the approach according to the invention, food products of extremely varied consistencies and temperatures can be processed: The method is particularly suitable for processing pasty and/or lumpy cheese mixtures and/or cheese products, for processing meat products, such as minced meat and lumpy meat masses, for processing fruit and vegetables in a lumpy or mushy consistency, for processing baby foods and pet food, as well as for processing any other pumpable food product.

A particular advantage of the approach according to the invention is that the current mass flow rate of a food product to be processed cold or hot can be determined very precisely at any time, such that a recipe can be accordingly accurately implemented using the food product in which further ingredients, such as water, spices and coloring, are added to the food product.

Advantageously, the time period over which the mass change is determined and the pump parameter is registered is predetermined on the basis of the characteristics of the food product and its behavior during processing. In general, the time period should be selected to be long enough that expected short-term fluctuations are averaged out. On the other hand, the time period should not be selected to be so long that the characteristics of the food product and the behavior change in the process. In the case of processed cheese preparations to be processed, time periods of the order of half a minute to a few minutes have proven successful.

Since the specific delivery rate is currently measured in each case, the method according to the invention is not sensitive to changes in conditions such as the pump characteristics and the properties of the product to be pumped, of which the viscosity, porosity, density and coefficient of friction can fluctuate in the course of processing. In particular, the lack of sensitivity to high viscosities and porosities makes the method particularly suitable for use in the processing of processed cheese raw mixtures. Because of the constantly updated measurements, the wear of the pump is accordingly also taken into account in the measurement result.

Obviously, the invention can be summarized in that the value of the mass flow rate that contains the above-mentioned defects and is set via the parameter of the delivery pump is corrected with a currently measured and averaged value of the change in mass, as results from the weighing. For example, a mass decrease in the buffer container of 50 kg within the last minute may have been determined by the weighing device. During this time period, the delivery pump has rotated at an average speed of 3 revolutions per second with 40 Hz accordingly set on the frequency converter. According to the invention, these values result in a current specific mass flow rate of 75 kg per (h*Hz).

Characteristic parameters in the processing of a processed cheese raw mixture are almost 300 revolutions per minute for the speed of the delivery pump, which is accompanied by a speed on the motor of the delivery pump of almost 1500 revolutions per minute and a frequency on the frequency converter of 50 Hz.

The magnitude determined in this way can be described as a "specific" delivery capacity because it is ultimately independent of time. Ultimately, the time unit would be canceled out in the calculation to [kg/(h*Hz)]=[kg/(h*(revolutions/h))]=[kg/revolution].

Assuming that the delivery pump has a linear characteristic curve with respect to the registered pump parameter, the "specific" delivery capacity calculated in this way can be used to accurately set the mass flow rate desired for the processing process of the highly viscous food product during operation by specifying the pump parameter, in particular by specifying the frequency of the frequency converter.

The method according to the invention can be used particularly advantageously in the processing of such food products which have only a defined number of different operating states, the operating states being defined by the ability to be pumped by the delivery pump. The processed cheese raw mixtures in question are food products which only have a few operating states, over which the characteristic curve of the delivery pump behaves linearly. Advantageously, the linear behavior of the operating states is used for the regulation of the delivery pump and in particular for setting a specific delivery flow in the context of a filling line.

As has been found, the method according to the invention is suitable for the processing of highly viscous to pasty food products, in particular processed cheese raw mixtures, which, when processed, have a viscosity of greater than 1000 cP, in particular of greater than 5000 cP. Therefore, typical processed cheese raw mixtures have viscosities of between 10,000 cP and 40,000 cP.

In the following, the invention will be explained in greater detail on the basis of an embodiment shown in the drawings:

The FIGURE shows a diagram of a system for determining the claimed specific mass flow rate of a highly viscous food product which has a viscosity of greater than 1000 cP. The system shown here is integrated into a processing process in which, in the present case, various types of natural cheese are mixed to form a processed cheese raw mixture 1 and supplied to a buffer container 2 via a pipeline 3. In subsequent processing steps, this processed cheese raw mixture is melted in order to be supplied to the end of a machine that forms and packages the product. Appropriately designed delivery pumps 4 are used for transporting the product through the pipelines.

In the embodiment shown, the processed cheese raw mixture 1 is removed from the buffer container 2 via a pipeline 5 by the delivery pump 4. The delivery pump 4 is associated with a control unit 6, which adjusts the speed and thus the current delivery rate by means of a frequency converter via the bidirectional data line 11. The buffer container 2 stands on a weighing device 7, by means of which the weight of the buffer container 2, which decreases by a delivery flow that is as continuous as possible, is measured as a change over time in the mass ($\Delta m/\Delta t$) and is averaged over a predetermined defined time period. The value of the $$\frac{\Delta m}{\Delta t} = \dot{m}\ [\text{kg/h}]$$

average change over time in the mass is output via a data line 8 to a means 9 for calculating the specific mass flow rate. The means is implemented by a computer 9.

At the same time, a pump parameter proportional to the expected delivery rate, in the present case in particular the average of the frequency in Hz used for actuation, which is proportional to the pump speed, is determined via a corresponding means, in this case by means of the control unit 6. This value $$\bar{f}\ [\text{Hz}]$$

is also output via a data line 10 to the computer 9. From the average change in mass measured within the defined period of time and the average pump parameter determined approximately in the same period, the computer 9 calculates the current specific mass flow rate as the quotient of the two input variables in the present case to $$\dot{m}_{spez} = \frac{\dot{m}}{\bar{f}}\ \left[\frac{\text{kg}}{\text{h\,Hz}}\right]$$

This specific mass flow rate can be understood as the incline of a straight line in a diagram 12 in which the mass flow rate in [kg/h] is plotted against the frequency of the converter in [kg/h]. In this case, the specific mass flow rate depends on the operating state 13 of the product. A product such as the processed cheese raw mass in question has few (in the present case only three, for example) defined (natural) operating states 13, which differ in terms of their flowability. During processing, the current operating state 13 of the product and thus the value for the specific mass flow rate is known at all times.

Using the value for the specific mass flow rate, the mass flow rate to be conveyed by the delivery pump can be set by specifying a certain frequency at the frequency converter:

$$\dot{m} = \dot{m}_{spez} \cdot f \left[\frac{\text{kg}}{\text{h}}\right]$$

By way of the mass flow rate which can be predetermined in this way, the entire production process, in particular the delivery flow in a filling line, can be controlled.

A particularly advantageous use of the approach according to the invention in the production of processed cheese products lies in the option of setting or regulating the consistency of the raw mass to be processed:

It is known that protein breakdown progresses to different degrees depending on the degree of maturity of the cheese raw materials used in the processed cheese. As the cheese matures, it loses the ability to form a structure, and therefore a higher dry matter content must be set to ensure the desired consistency. On the other hand, when using particularly young raw material, dry matter can be saved, with the specified dry masses needing to be adhered to as the lower limit. Since the fluctuations in the degree of maturity of the matured cheese raw material used usually only become apparent during the melting process, it is advantageous to increase the dry masses in the raw mixture in a targeted manner and to adjust them via accurate metering of water such that the final consistency of the processed cheese meets the specifications. However, in order to be able to ensure accurate metering of water with fluctuating production quantities, the flow rate of the cheese raw mixture must be known.

Using the method of quantity measurement according to the invention, this value can be reliably set such that such consistency control or regulation is made possible. The water volume can be accurately supplied by means of a diaphragm pump which is automatically regulated to a viscosity setpoint which can be measured using an inline viscometer. Alternatively, the water supply can also be regulated by hand. In this case, the deviation from the target consistency is visually displayed to the plant operator.

Another use of the approach according to the invention is particularly advantageous system regulation in a continuous heating process. The aim of this system regulation is to heat a defined product quantity in [kg/h] to a defined temperature, the product quantity usually being regulated by indirect variables, such as pump speed or frequency of the frequency converter, and not by the effectively supplied product quantity in [kg/h]. Setting using indirect variables is only permissible, however, provided that a homogeneous product having uniform density and initial temperature is processed. Only then do specific pump speeds and frequencies of the frequency inverter correlate with specific system throughputs.

As stated above, processed cheese raw mixtures have different behavior. Depending on the recipe, fat content and temperature, this results in different porosities and conveying properties. In practice, for example, this may cause a pump to convey between 80 and 110 kg/h/Hz at the same setting on the frequency converter.

According to the invention, this problem can be counteracted by using the effective flow rate (kg/h) measured according to the invention for the regulation instead of just the pump speed or the frequency converter frequency. This stands up against the fluctuating conveying behavior of the pump and the lack of inhomogeneity in the product composition.

The invention claimed is:

1. A method for determining a specific mass flow rate of a highly viscous food product (1) having a viscosity of greater than 100 cP, which during processing in a continuous delivery flow is supplied to or removed from a buffer container (2) by means of a delivery pump (4), comprising:
   (a) Pumping a food product into, or out of, a buffer container using a delivery pump (4);
   (b) measuring a change in weight of the buffer container (2) over a defined time period during step (a),
   (c) registering a pump parameter value of the delivery pump (4) that is proportional to a rate of delivery of the food product to the buffer container at multiple times during the defined time period,
   (d) calculating an average pump parameter over the defined time period by averaging the pump parameter values registered over the defined time period in step (c), and
   (e) calculating a specific mass flow rate by dividing the weight change measured in (b) by the averaged pump parameter calculated in step (d).

2. The method according to claim 1, wherein
a highly viscous to pasty processed cheese raw mixture (1) having a viscosity of greater than 1000 cP is processed as the food product.

3. The method according to claim 1, wherein
the food product (1) is removed from the buffer container (2) in step (a) and the decrease in weight of the buffer container is registered in step (b).

4. The method according to claim 3, wherein
the delivery pump (4) has a speed and the pump parameter measured in step (c) is the speed of the delivery pump (4) and/or a parameter proportional to the speed of the delivery pump.

5. The method according to claim 4, wherein
the specific mass flow rate of step (e) is calculated as "kilograms per hour and per revolutions per hour of delivery pump".

6. The method according to claim 4, wherein
the specific mass flow rate calculated in step (e) is assigned to one of a plurality of operating states of the delivery pump (4), the operating states correlating with different physical states of the food product.

7. The method according to claim 6, wherein
the operating states have a linear behavior and the linear behavior of the operating states is used to set a specific delivery flow.

8. The method according to claim 1 further comprising using the specific mass flow rate calculated in step (e) to set a pump parameter value corresponding to the mass flow rate to be conveyed by the delivery pump (4).

9. A system for determining a specific mass flow rate of a highly viscous food product (1) having a viscosity greater than 100 cP comprising a buffer container (2) and a delivery pump (4) for supplying or removing the food product (1) to or from the buffer container (2) in a continuous delivery flow, further comprising a weighing device (7) engaged with the buffer container which is configured to measure the weight of the buffer container (2) and generate an output corresponding to the weight of the buffer container, and a device, or a combination of devices, configured to (a) receive the output generated by the weighing device and calculate a change in weight of the buffer container over a defined time period based on the output generated by the weighing device over the defined time period, (b) receive a pump parameter of the delivery pump (4) that is proportional to an expected delivery rate in the defined time period and calculate an average pump parameter over the defined time period, and (c) calculate and output a specific mass flow rate by dividing the change in the weight of the buffer container (2) over the defined time period by the average pump parameter.

\* \* \* \* \*